United States Patent [19]

Watanabe et al.

[11] Patent Number: 5,602,215
[45] Date of Patent: Feb. 11, 1997

[54] POLYMER SCALE DEPOSITION PREVENTIVE AGENT AND PROCESS OF PRODUCING POLYMER USING THE SAME

[75] Inventors: Mikio Watanabe; Toshihide Shimizu, both of Ibaraki-ken, Japan

[73] Assignee: Shin-Etsu Chemical Co., Ltd., Tokyo, Japan

[21] Appl. No.: 540,768

[22] Filed: Oct. 11, 1995

[30] Foreign Application Priority Data

Oct. 12, 1994 [JP] Japan .................................. 6-272876

[51] Int. Cl.$^6$ .................................. C08F 2/00; C08F 4/615
[52] U.S. Cl. .................................. 526/62; 526/74
[58] Field of Search .................................. 526/62, 74

[56] References Cited

U.S. PATENT DOCUMENTS

| | | | |
|---|---|---|---|
| 5,142,003 | 8/1992 | Usuki et al. | 526/62 |
| 5,201,945 | 4/1993 | Shimizu et al. | 526/62 |
| 5,401,815 | 3/1995 | Shimizu et al. | 526/62 |
| 5,416,174 | 5/1995 | Shimizu et al. | 526/62 |

FOREIGN PATENT DOCUMENTS 0372968  6/1990  European Pat. Off. .................. 526/62

*Primary Examiner*—Paul R. Michl
*Assistant Examiner*—Olga Asinovsky
*Attorney, Agent, or Firm*—Oblon, Spivak, McClelland, Maier & Neustadt, P.C.

[57] ABSTRACT

A polymer scale deposition preventive agent for use in polymerization of a monomer having an ethylenically unsaturated double bond, comprising an aluminum fluoride.

According to the present invention, deposition of polymer scale in a polymerization vessel can be effectively prevented, not only on the areas in the liquid-phase region but also on the areas around the interface between the gas phase and the liquid phase. In addition, the polymer obtained can be formed into products which have very few fish eyes.

The application of the present invention to polymerization makes it unnecessary to remove polymer scale for every polymerization run, thereby improving productivity.

17 Claims, No Drawings

POLYMER SCALE DEPOSITION PREVENTIVE AGENT AND PROCESS OF PRODUCING POLYMER USING THE SAME

BACKGROUND OF THE INVENTION

1. Field of the Invention

The present invention relates to a polymer scale deposition preventive agent for use in polymerization of a monomer having an ethylenically unsaturated double bond, and a process for producing a polymer using the same.

2. Description of the Prior Art

Heretofore, processes for polymerization of a vinyl monomer are known, such as suspension, emulsion, solution, gas phase and bulk polymerization processes and the like. In any of these polymerization processes, polymer scale is liable to be deposited on the areas with which the monomer comes into contact, such as inner walls, stirring equipment and so on of a polymerization vessel.

The deposition of polymer scale results in disadvantages that the yield of the polymer and cooling capacity of the polymerization vessel are lowered, and that the polymer scale may peel off and mix into a polymeric product, thereby impairing the quality of the product. In addition, removal of the deposited polymer scale is very laborious and time-consuming, and since the polymer scale contains unreacted monomers (vinyl chloride and the like), it is accompanied by a risk of causing physical disorders in the operators, which has been a very serious problem in recent years.

For preventing polymer scale deposition on the polymerization vessel inner wall and so forth, methods have been known, for example, a method in which a polymer scale deposition preventive agent comprising a polar organic compound such as amine compounds, quinone compounds, aldehyde compounds, etc. is applied to the polymerization vessel inner wall and so on and a method in which such compounds are added to an aqueous medium in which suspension polymerization is carried out (Japanese Patent Publication (KOKOKU) No. 45-30343).

However, according to these methods, although the polymer scale deposition preventive effect is exhibited while polymerization is repeated for up to about 5 or 6 batches, the effect diminishes if the number of repeated batches of polymerization exceeds 5 or 6 (that is, the scale deposition preventive effect is poor in durability). The disadvantage is emphasized particularly where a water-soluble catalyst is used for polymerization, and, therefore, these methods are unsatisfactory industrially.

For overcoming the above disadvantage, Japanese Pre-examination Patent Publication (KOKAI) No. 53-13689 proposes a method in which the inner wall, etc. of a polymerization vessel are coated with a polymer scale deposition preventive agent comprising a condensation product of an aromatic amine compound as an effective constituent. Where the polymer scale deposition preventive agent is applied to the areas with which monomers come into contact, such as the inner wall surface of a polymerization vessel, it is possible to repeat about 100 to 200 batches of polymerization without causing deposition of polymer scale on the areas located in the liquid-phase region inside the polymerization vessel. Besides, even in the case where a water-soluble catalyst is used, deposition of polymer scale in the liquid-phase region is similarly prevented.

However, there is a drawback that polymer scale deposition may occur on the areas around the interface between the liquid phase and the gas phase located at the upper section of the interior of the polymerization vessel.

Once polymer scale deposition occurs on the areas around the interface between the gas and liquid phases, the deposited scale will grow gradually as polymerization runs are repeated, and at last it may peel off to be incorporated into a polymeric product. When the polymeric product with the polymer scale thus mixed therein is processed into formed products such as sheets or the like, the polymer scale causes generation of many fish eyes in the formed products and thereby lowers seriously the quality thereof.

Besides, when the polymeric product is worked into a formed product such as sheet or the like without any addition of a coloring agent, the resulting formed product is more or less discolored and such discoloration, called initial discoloration, is desired to be as slight as possible. However, the aforesaid coating film of the condensation product of an aromatic amine compound and an aromatic nitro compound may be peeled off or dissolved and then mixed in the polymeric product, thereby increasing the initial discoloration.

Furthermore, when the coating film of the condensation product of an aromatic amine compound and an aromatic nitro compound is formed, the condensation product is used as a coating liquid prepared by dissolving it in an organic solvent or a mixture of an organic solvent as the main component and water; therefore, the use of it is accompanied by danger of catching fire or explosion and a problem of safety in handling due to its toxicity.

SUMMARY OF THE INVENTION

Accordingly it is an object of the present invention to provide a polymer scale deposition preventive agent that can prevent effectively the deposition of polymer scale, not only on the areas in the liquid phase region but also on the areas around the interface between the gas and liquid phases inside a polymerization vessel, that makes it possible to produce a polymer having a very small number of fish eyes and slight initial discoloration when being processed into formed products such as sheets or the like, and that is accompanied by no danger of an organic solvent catching fire or exploding and is safe in handling; and a polymerization vessel and a process for producing a polymer using the polymer scale deposition preventive agent.

The present invention provides, as a means of achieving the above object, a polymer scale deposition preventive agent for use in polymerization of a monomer having an ethylenically unsaturated double bond, comprising an aluminum fluoride.

The present invention also provides a process for producing a polymer comprising polymerizing a monomer having an ethylenically unsaturated double bond in a polymerization vessel having a polymer scale deposition preventive coating film on its inner wall surfaces, wherein said coating film comprises an aluminum fluoride.

According to the present invention, deposition of polymer scale in a polymerization vessel can be effectively prevented, not only on the areas in the liquid-phase region but also on the areas around the interface between the gas phase and the liquid phase. In addition, the polymer obtained can be formed into products such as sheets or the like which have very few fish eyes.

The application of the present invention to polymerization makes it unnecessary to remove polymer scale for every polymerization run, thereby improving productivity.

Aluminum Fluoride

The aluminum fluoride which is an essential component of the polymer scale deposition preventive agent of the present invention, includes, for example, and the like. Especially, preferred is $AlF_a$ colloids in which $AlF_a$ particles are dispersed in water and/or an organic solvent which is miscible with water. The colloid particles preferably have a diameter of 1 to 500 nm, and more preferably have a diameter of 4 to 200 nm.

The aluminum fluoride may be used in a state in which a ceramic containing an aluminum fluoride is atomized.

The method of producing the particles and/or colloid is not limited, which may be prepared by, e.g., mechanical grinding, irradiation with ultrasonic waves, electrical dispersion and chemical processes.

The polymer scale deposition preventive agent according to the present invention is normally prepared in a liquid state (coating liquid) by dissolving or dispersing an aluminum fluoride in a suitable solvent, and is applied to areas on which polymer scale is liable to be deposited in a polymerization vessel, followed by drying, to form a coating film thereon. The concentration of the aluminum fluoride in the coating liquid is not particularly limited as long as the total coating weight described below is obtained. Normally it ranges from about 0.001 to about 15 % by weight, preferably from 0.01 to 1% by weight.

Inorganic Colloid

Preferably, an inorganic colloid other than the aluminum fluoride is used in combination with the aluminum fluoride, thereby the polymer scale deposition preventing effect being further enhanced. The inorganic colloid includes, for example, ferric hydroxide colloids, silicate colloids, barium sulfate colloids, gold colloids, silver colloids, aluminum hydroxide colloids, sulfur colloids, titanium oxide colloids, antimony oxide colloids, antimony sulfate colloids, tin oxide colloids, iron ferricyanide colloids, iron ferrocyanide colloids, and the like. Out of these, preferred are ferric oxide colloids, silicate colloids, gold colloids, and aluminum hydroxide colloids. The particle diameter of the colloid preferably in the range of 1 to 500 nm, more preferably from 4 to 200 nm.

The amount of the inorganic colloid is normally in the range of 1 to 2,000 parts by weight, preferably from 10 to 500 parts by weight, per 100 parts by weight of the aluminum fluoride. If the amount of the organic colloid is too large, the polymer scale deposition effect may be lowered. If the amount too small, the effects of the combined use are not obtained.

In the case where an aluminum fluoride is used in combination with another inorganic colloid, the total concentration thereof is normally in the range of 0.001 to 15% by weight, preferably from 0.03 to 2% by weight.

In the most preferred embodiment of the present invention, an aluminum fluoride is used in combination with another inorganic colloid, particularly at least one selected from the group consisting of ferric hydroxide colloids, silicate colloids, gold colloids, and aluminum hydroxide colloids.

The inorganic colloids other than the aluminum fluoride may be used either singly or in combination of two or more.

Preparation of Coating Liquid

The medium for use in preparation of the coating liquid includes water and mixed solvents of water with a medium miscible with water. The medium which is miscible with water includes, for example, alcohols such as methanol, ethanol, propanol, and the like; ketones such as acetone, methyl ethyl ketone, and the like; esters such as methyl acetate, ethyl acetate, and the like. These may be used either singly or as a mixed solvent of two or more thereof on a case-by-case basis. In the case where a mixed solvent of water and an organic solvent miscible with water is used, the content of the organic solvent should be in a range such that danger of catching fire, explosion or the like can be obviated and that no problem in respect of handling due to toxicity or the like arises. Specifically, it is preferably 50% by weight or less, and more preferably 30% by weight or less. If an organic solvent is contained in too large an amount, there will be a danger of catching fire, explosion or the like, and a problem in handling due to toxicity or the like.

To the coating liquid may be optionally added, for example, a cationic, nonionic or anionic surface active agent, and a pH adjuster such as phosphoric acid, perchloric acid, sulfuric acid, hydrochloric acid, nitric acid, phytic acid, acetic acid, p-toluenesulfonic acid, tannic acid, ethylenediamine, NaOH and the like, as long as the polymer scale preventing effects are not impaired.

Furthermore, to the coating liquid may be optionally added a water-soluble polymeric compounds such as hydroxyl group-containing polymeric compounds, cationic polymeric compounds, anionic polymeric compounds and amphoteric polymeric compounds.

The hydroxyl group-containing polymeric compounds include, for example, starches and their derivatives, such as amylose, amylopectin, dextrin, oxidized starch, acetyl starch, nitro starch, methyl starch, carboxymethyl starch, etc.; hydroxyl group-containing plant mucoids such as pectic acid, protopectic acid, pectinic acid, alginic acid, laminarin, fucoidin, agar-agar, carragheenin, etc.; hydroxyl group-containing animal mucoids such as hyaluronic acid, chondroitin sulfuric acid, heparin, keratosulfuric acid, chitin, chitosan, charonin sulfuric acid, limacoitin sulfuric acid, etc.; nucleic acids such as ribonucleic acid, deoxyribonucleic acid, etc.; cellulose derivatives such as methyl cellulose, ethyl cellulose, carboxymethyl cellulose, glycol cellulose, benzyl cellulose, cyanoethyl cellulose, methylene ether of cellulose, triphenyl methyl cellulose, formyl cellulose, cellulose acetate, cellulose propionate, cellulose butyrate, cellulose acetate propionate, cellulose sulfate, cellulose carbamate, nitrocellulose, cellulose phosphate, cellulose xanthogenate, etc.; hemicelluloses such as xylan, mannan, arabogalactan, galactan, araban, etc.; lignins such as alcohol lignin, dioxane lignin, phenol lignin, hydrotropic lignin, mercaptolignin, thio-alkali lignin, acid lignin, cuproxam lignin, periodate lignin, etc.; phenol-formaldehyde resins, partially saponified polyvinyl alcohols, polyvinyl alcohols, and so forth.

The cationic polymeric compounds include, for example, cationic polymeric electrolytes containing positively charged nitrogen atoms in side chains, such as polyvinylamines, polyethyleneamines, polyethyleneimines, polyacrylamides, N-vinyl-2-pyrrolidone/acrylamide copolymer, cyclized polymers of dimethyldiamylammonium chloride, cyclized polymers of dimethyldiethylammonium bromide, cyclized polymers of diallylamine hydrochloride, cyclized copolymers of dimetyldiallylammonium chloride and sulfur dioxide, polyvinylpyridines, polyvinylpyrrolidones, polyvinylcarbazoles, polyvinylimidazolines, polydimethylaminoethyl acrylates, polydimethylaminoethyl methacrylates, polydiethylaminoethyl acrylate, polydiethylaminoethyl methacrylate, and the like.

The amphoteric polymeric compounds include, for example, gelatin, casein, albumin and the like.

The anionic polymeric compounds include, for example, sulfomethylated products of polyacrylamide; polyacrylic acid; arginic acid, acrylamide-vinylsulfonic acid copolymer, polymethacrylic acid, polystyrenesulfonic acid, and the like and alkali metal salts and ammonium salts of these; and anionic polymeric compounds having a carboxyl group or sulfon group in its side chain(s) such as carboxymethyl cellulose.

Further, to the coating liquid, an inorganic compound other than the aluminum fluoride and the inorganic colloids described above may be optionally added, as long as the scale preventing action is not impaired. The inorganic compounds which may be added include for example silicic acids and silicates such as orthosilicic acid, metasilicic acid, mesodisilicic acid, mesotrisilicic acid, mesotetrasilicic acid, sodium orthosilicate, sodium disilicate, sodium tetrasilicate, water glass and the like; and metallic salts such as oxyacid salts, acetates, nitrates, hydroxides and halides of metals selected from the alkaline earth metal family metals such as magnesium, calcium, and barium, zinc family metals such as zinc, aluminum family metals such as aluminum, and platinum family metals such as platinum.

Formation of Coating Film

To form a coating film on inner wall surfaces of a polymerization vessel using the coating liquid prepared as above-described, first the coating liquid is applied to the inner wall surfaces of the polymerization vessel. Then, the applied coating liquid is dried sufficiently at a temperature ranging, for example, from room temperature to 100° C., optionally followed by washing with water.

The coating liquid is preferably applied to not only the inner wall surfaces of a polymerization vessel but also other areas with which the monomer comes into contact during polymerization, for example, stirring blades, stirring shaft, baffles, condensers, headers, search coil, bolts, nuts, etc.

More preferably, for formation of the coating film, the coating liquid is applied to areas with which the monomer does not come into contact during polymerization but on which polymer scale may be deposited, for example, the inner surfaces, etc. of equipment and pipes of an unreacted monomer recovery system. Specifically, such areas include the inner surfaces of monomer distillation columns, condensers, monomer stock tanks, valves, and so on.

The formation of the coating film on the areas with which a monomer may come into contact or the other areas on which polymer scale may be deposited, prevents polymer scale from being deposited on the areas.

The method of applying the coating liquid to the inner wall surfaces of a polymerization vessel is not particularly restricted, and includes, for example, brush coating, spray coating, a method in which the polymerization vessel is filled with the coating liquid, followed by withdrawal thereof, and automatic coating methods as disclosed in Japanese Pre-examination Patent Publication (KOKAI) Nos. 57-61001 and 55-36288, Japanese Patent Publication (KOHYO) Nos. 56-501116 and 56-501117, and Japanese Pre-examination Patent Publication (KOKAI) No. 59-11303, etc.

The method of drying wet coated surfaces provided by application of the coating liquid, is also not restricted, including e.g. the methods below. A method in which, after the coating liquid is applied, hot air with a suitable elevated temperature is blown to the coated surface; a method in which the inner wall surfaces of a polymerization vessel and the surfaces of other parts to be coated are preliminarily heated to a temperature of, e.g., 30° to 80° C., and the coating liquid is directly applied to the heated surfaces; and so on. After being dried, the coated surfaces are washed with water if necessary.

Preferably, the coating film obtained in this manner has a total coating weight, after being dried, of normally 0.001 $g/m^2$ or more, more preferably 0.05 to 2 $g/m^2$.

The application operation above performed every batch to every ten and several batches is sufficient. The formed coating film has good durability and retains the polymer scale-preventing action; therefore, the above-described application operation is not necessarily be carried out every batch of polymerization. Accordingly, productivity is improved.

Polymerization

After the formation of the coating film on the inner wall surfaces of a polymerization vessel, and preferably also on other areas with which monomer may come into contact during polymerization, etc. by the application operation as above, polymerization is carried out in accordance with conventional procedures. That is, a monomer having an ethylenically unsaturated double bond, a polymerization initiator (catalyst), and optionally a polymerization medium such as water, etc., a dispersing agent such as suspending agents, solid dispersing agents, nonionic or anionic emulsifying agents, etc., and the like are charged into the polymerization vessel, and then polymerization is conventionally carried out.

The monomers having an ethylenically unsaturated double bond which can be polymerized by applying the process of the present invention include, for example, vinyl halides such as vinyl chloride and the like; vinyl esters such as vinyl acetate, vinyl propionate and the like; acrylic acid, methacrylic acid, and their esters and salts; maleic acid, fumaric acid, and their esters and anhydrides; diene monomers such as butadiene, chloroprene, isoprene and the like; styrene; acrylonitrile; vinylidene halides; vinyl ethers; and so forth. These monomers may be used either singly or in combination of two or more.

There are no particular restrictions on the type of polymerization to which the process according to the present invention can be applied. That is, the process of the present invention is effective in any of such polymerization types as suspension polymerization, emulsion polymerization, solution polymerization, bulk polymerization, and gas phase polymerization. Particularly, the process is more suited to polymerization in an aqueous medium, such as suspension polymerization and emulsion polymerization.

In the following, taking the cases of suspension polymerization and emulsion polymerization as examples, general procedures of polymerization will be described.

First, water and a dispersing agent are charged into a polymerization vessel. Subsequently, the polymerization vessel is evacuated to reduce the internal pressure to a value of 0.1 to 760 mmHg, and a monomer is then charged, whereupon the internal pressure usually becomes a value of 0.5 to 30 $kgf/cm^2$.G. A polymerization initiator is charged into the vessel before and/or after charging the monomer. Subsequently, polymerization is carried out at a reaction temperature of 30° to 150° C. During the polymerization, one or more of water, a dispersing agent and a polymerization initiator may be added, if necessary. Reaction temperature during the polymerization is different depending on the kind of monomer to be polymerized. For example, in the case of polymerizing vinyl chloride, polymerization is carried out at 30° to 80° C.; in the case of polymerizing styrene, polymerization is carried out at 50° to 150° C. The polymerization is considered to have been completed when the pressure inside the polymerization vessel has fallen to a level of 0 to 7 kgf/cm$^2$.G or when cooling water which is let to flow into and out of a jacket provided around the polymerization vessel has come to show an approximately equal temperature at the inlet and outlet (i.e., when liberation of heat due to polymerization reaction has subsided). The amounts of the water, dispersing agent and polymerization initiator to be charged for polymerization are normally 20 to 500 parts by weight, 0.01 to 30 parts by weight, and 0.01 to 5 parts by weight, respectively, per 100 parts by weight of the monomer.

In solution polymerization, an organic solvent such as toluene, xylene, pyridine, etc. is used as a polymerization medium, in place of water. A dispersing agent may be used optionally. The other conditions for polymerization are generally the same as those described for suspension and emulsion polymerizations.

In bulk polymerization, after a polymerization vessel is evacuated to a pressure of about 0.01 mmHg to about 760 mmHg, a monomer and a polymerization initiator are charged into the polymerization vessel, and then polymerization is carried out at a reaction temperature of −10° C. to 250° C. For example, the reaction temperature is 30° to 80° C. for polymerization of vinyl chloride, and is 50° to 150° C. for polymerization of styrene.

Where polymerization is carried out by applying the method of preventing polymer scale deposition according to the present invention, it is possible to prevent polymer scale from being deposited, regardless of the materials of the inner wall, etc. of a polymerization vessel. For example, where the polymerization vessel is made of a stainless steel or other steel as well as where the polymerization vessel is a glass-lined one or the like, the polymer scale deposition can be prevented from occurring.

The additive materials which have been conventionally added in polymerization systems can be used without any limitations. That is to say, the process of the present invention can effectively prevent polymer scale deposition in polymerization systems which may contain additive materials including, for example, polymerization initiators such as t-butyl peroxyneodecanoate, bis(2-ethylhexyl) peroxydicarbonate, 3,5,5-trimethylhexanoyl peroxide, α-cumyl peroxyneodecanoate, cumene hydroperoxide, cyclohexanone peroxide, t-butyl peroxypivalate, bis(2-ethoxyethyl) peroxydicarbonate, benzoyl peroxide, lauroyl peroxide, 2,4-dichlorobenzoyl peroxide, diisopropyl peroxydicarbonate, α, α'-azobisisobutyronitrile, α,α'-azobis-2,4-dimethylvaleronitrile, potassium peroxodisulfate, ammonium peroxodisulfate, p-menthane hydroperoxide, etc.; suspending agents comprised of, for example, natural or synthetic polymeric compounds such as partially saponified polyvinyl alcohols, polyacrylic acids, vinyl acetate/maleic anhydride copolymers, cellulose derivatives (e.g. hydroxypropyl methyl cellulose), gelatin, etc.; solid dispersing agents such as calcium phosphate, hydroxyapatite, etc.; nonionic emulsifying agents such as sorbitan monolaurate, sorbitan trioleate, polyoxyethylene alkyl ether, etc.; anionic emulsifying agents such as sodium lauryl sulfate, sodium alkylbenzenesulfonates (e.g. sodium dodecylbenzenesulfonate), sodium dioctylsulfosuccinate, etc.; fillers such as calcium carbonate, titanium oxide, etc.; stabilizers such as tribasic lead sulfate, calcium stearate, dibutyltin dilaurate, dioctyltin mercaptide, etc.; lubricants such as rice wax, stearic acid, cetyl alcohol, etc.; plasticizers such as DOP, DBP, etc.; chain transfer agents such as mercaptans (e.g. t-dodecyl mercaptan), trichloroethylene, etc.; pH adjusters, and so forth.

In addition to being used for formation of the coating film on the inner wall surfaces, etc. of the polymerization vessel, the polymer scale deposition preventive agent of the present invention may further be added directly to the polymerization system, whereby the effect of preventing deposition of polymer scale can be enhanced. In that case, the amount of the agent to be added suitably ranges from about 10 to about 1000 ppm based on the total weight of the monomer or monomers charged into the polymerization vessel. At the time of adding the polymer scale deposition preventive agent, care should be taken not to affect adversely the quality of the resulting polymeric product in fish eyes, bulk specific gravity, particle size distribution, etc.

EXAMPLES

The present invention will now be described in detail below, with reference to working examples thereof and comparative examples. In the tables below, the experiments bearing a No. marked with * are comparative examples, and the other experiments, bearing a non-marked No., are working examples of the present invention.

Example 1

Experiment Nos. 101 to 121

In each experiment, a stainless-steel polymerization vessel having an internal capacity of 1000 liters and equipped ith a stirrer was used to carry out polymerization, as described below.

The aluminum fluoride (A), inorganic colloid (B), solvent and pH adjuster used in each experiment are given in Table 1. The inorganic colloids used in Examples 1 and 2 had particle diameters as given in Table 3.

In each experiment, firstly, an aluminum fluoride and/or inorganic colloid were dissolved or dispersed so that the total concentration might become the value as given in Table 1, to prepare a coating liquid. The coating liquid was applied to the inner wall of the polymerization vessel and to the stirring shaft, stirring blades and the like parts with which the monomer comes into contact during polymerization, and the coating liquid thus applied was dried by heating at 50° C. for 15 minutes to form a coating film, followed by washing with water.

It is noted that Experiment No. 102 is a comparative experiment in which no coating liquid was applied, and Experiment No. 103 is a comparative experiment in which a coating liquid not meeting the requirements according to the present invention was applied. Experiment No. 121 is a comparative experiment in which a coating liquid containing the Condensation product No.1 described in Japanese Patent Publication (KOKOKU) No. 60-30681 was applied.

Subsequently, in the polymerization vessel having the coating film formed by the application treatment as above was charged with 400 kg of water, 200 kg of vinyl chloride, 200 g of a partially saponified polyvinyl alcohol, 30 g of hydroxypropyl methyl cellulose and 70 g of 3,5,5-trimethylhexanoyl peroxide, followed by carrying out polymerization with stirring at 66° C. for 5 hours. After the polymerization was finished, a polymeric product and unreacted monomer were recovered, and the inside of the polymerization vessel was washed with water to remove residual resin.

The above process from applying the coating liquid through carrying out polymerization to washing with water was repeated batchwise 20 times. After 20th batch was over, the amount of polymer scale deposited was measured according to the method below. However, in Experiment Nos. 102 and 103, since much polymer scale was deposited after the first polymerization run, the polymerization run was not repeated and the polymer scale deposited by the first batch was measured. The amount of the polymer scale deposited was measured on an area of the inner wall which was in contact with the liquid phase during polymerization and an area which was located around the interface between gas and liquid phases. The results are given in Table 2.

The polymer obtained in each Experiment was formed into sheet, and fish eyes were measured according to the method below. The results are given in Table 2.

Measurement of the amount of polymer scale deposited

The scale deposited in an area of 10 cm square was scraped off with a spatula as completely as can be confirmed with the naked eye, and then the scraped scale was weighed on a balance. The measured value was multiplied by 100 to obtain the amount of the deposited polymer scale per area of 1 m$^2$.

Measurement of fish eyes

A hundred (100) parts by weight of a polymer obtained, 50 parts by weight of dioctyl phthalate (DOP), 1 part by weight of dibutyltin dilaurate, 1 part by weight of cetyl alcohol, 0.25 part by weight of titanium oxide and 0.05 part by weight of carbon black were mixed. The resulting mixture was kneaded at 150° C. for 7 minutes with 6 inch rolls, and then formed into a sheet 0.2 mm thick. The obtained sheet was examined for the number of fish eyes per 100 cm$^2$ by light transmission.

Further, measurement of luminosity index (L value) of a sheet formed from a polymer obtained in each experiment was carried out, according to the method below. The results are given in Table 2.

Measurement of luminosity index (L value)

A hundred (100) parts by weight of an obtained polymer, 1 part by weight of a tin laurate stabilizing agent (TS-101, product of Akisima Chemical Co. ) and 0.5 part by weight of a cadmium stabilizing agent (C-100J, product of Katsuta Kako Co.), and 50 parts by weight of dioctyl phthalate as a plasticizer were kneaded at 160° C. for 5 minutes with a twin roll mill, and then formed into a sheet 1 mm thick. Subsequently, this sheet was placed in a molding frame measuring 4×4×1.5 cm, heated at 160° C. under a pressure of 65 to 70 kgf/cm$^2$ to prepare a test specimen. This test specimen was measured for luminosity index L in the Hunter's color difference equation described in JIS Z 8730 (1980). The greater the value of L, the higher the whiteness is evaluated, namely, the slighter the initial discoloration is evaluated.

The value of L is determined as follows.

The stimulus value Y of XYZ color system is determined by the photoelectric tristimulus colorimetry using the standard light C, photoelectric colorimeter (Color measuring color difference meter Model Z-1001DP, product of Nippon Denshoku Kogyo K.K.) in accordance with JIS Z 8722. As the geometric condition of illumination and light reception, the condition d defined in section 4.3.1 of JIS Z 8722 is adopted. From the stimulus value Y obtained, the L value is calculated based on the equation: $L=10Y^{1/2}$ described in JIS Z 8730 (1980).

TABLE 1

| Exp. No. | Aluminum fluoride | Inorganic colloid | Total con. (a) + (B) (%) | Wt. ratio (A)/(B) Solvent | Solvent (wt. ratio) | pH adjuster (pH) |
|---|---|---|---|---|---|---|
| 101 | AlF$_3$ colloid | Silicate colloid | 0.6 | 100/100 | Water/MeOH (50/50) | Ethylene-diamine (7.0) |
| 102* | None | None | — | — | — | — |
| 103* | None | Silicate colloid | 0.6 | 0/100 | Water/MeOH (50/50) | Ethylene-diamine (7.0) |
| 104 | AlF$_3$ colloid | None | 0.5 | 100/0 | Water/MeOH (50/50) | Phosphoric acid (5.0) |
| 105 | AlF$_3$ H$_2$O | None | 0.5 | 100/0 | Water/MeOH (50/50) | Phytyc acid (5.0) |
| 106 | AlF$_3$ 3H$_2$O | None | 0.5 | 100/0 | Water/MeOH (70/30) | Phosphoric acid (5.0) |
| 107 | AlF$_3$ 3H$_2$O | Silicate colloid | 1.0 | 100/500 | Water/Acetone (70/30) | NaOH (9.5) |
| 108 | AlF$_3$ 3H$_2$O | Iron hydroxide colloid | 0.8 | 100/200 | Water/MeOH (70/30) | NaOH (7.0) |
| 109 | AlF$_3$ 3H$_2$O | Gold colloid | 0.8 | 100/50 | Water/MeOH (70/30) | Tannic acid (6.5) |
| 110 | AlF$_3$ 3H$_2$O | Sulfur colloid | 0.8 | 100/100 | Water/MeOH (50/50) | Ethylene-diamine (8.5) |
| 111 | AlF$_3$ 3H$_2$O | Silver colloid | 0.8 | 100/50 | Water/MeOH (50/50) | Ethylene-diamine (9.0) |
| 112 | AlF$_3$ colloid | Aluminum hydroxide colloid | 0.6 | 100/150 | Water/MeOH (50/50) | Phosphoric acid (5.0) |
| 113 | AlF$_3$ colloid | Iron hydroxide colloid | 0.6 | 100/30 | Water/MeOH (50/50) | Phosphoric acid (5.0) |

TABLE 1-continued

| Exp. No. | Aluminum fluoride | Inorganic colloid | Total con. (a) + (B) (%) | Wt. ratio (A)/(B) Solvent | Solvent (wt. ratio) | pH adjuster (pH) |
|---|---|---|---|---|---|---|
| 114 | AlF$_3$ colloid | Gold colloid | 0.6 | 100/20 | Water/MeOH (50/50) | Phytic acid (5.0) |
| 115 | AlF$_3$ colloid | Silver colloid | 0.5 | 100/50 | Water/MeOH (50/50) | Phytic acid (5.0) |
| 116 | AlF$_3$ colloid | Sulfur colloid | 0.5 | 100/100 | Water/MeOH (70/30) | Phytic acid (5.0) |
| 117 | AlF$_3$ 9H$_2$O | Silicate colloid | 0.5 | 100/250 | Water/MeOH (70/30) | NaOH (10.0) |
| 118 | AlF$_3$ 9H$_2$O | Aluminum hydroxide colloid | 0.5 | 100/100 | Water/MeOH (70/30) | Phosphoric acid (4.5) |
| 119 | AlF$_3$ 9H$_2$O | Silver colloid | 0.6 | 100/100 | Water/MeOH (70/30) | NaOH (7.5) |
| 120 | AlF$_3$ 9H$_2$O | Sulfur colloid | 0.6 | 100/100 | Water/MeOH (70/30) | Phytic acid (5.5) |
| 121* | — | None | — | — | MeOH | — |

TABLE 2

Results after 20th batch

Polymer scale amount (g/m$^2$)

| Exp. No. | Liquid phase | Around interface between gas and liquid phases | Number of fish eyes | Luminosity index (L) |
|---|---|---|---|---|
| 101 | 0 | 3 | 2 | 72.5 |
| 102* | 350 | 1250 | 45 | 72.4 |
| 103* | 110 | 350 | 28 | 72.4 |
| 104 | 0 | 18 | 7 | 72.4 |
| 105 | 0 | 25 | 8 | 72.4 |
| 106 | 0 | 22 | 7 | 72.4 |
| 107 | 0 | 9 | 5 | 72.5 |
| 108 | 0 | 11 | 5 | 72.4 |
| 109 | 0 | 7 | 5 | 72.5 |
| 110 | 0 | 14 | 6 | 72.5 |
| 111 | 0 | 15 | 6 | 72.5 |
| 112 | 0 | 3 | 2 | 72.5 |
| 113 | 0 | 3 | 2 | 72.5 |
| 114 | 0 | 5 | 2 | 72.5 |
| 115 | 0 | 8 | 5 | 72.5 |
| 116 | 0 | 10 | 4 | 72.5 |
| 117 | 0 | 11 | 4 | 72.5 |
| 118 | 0 | 13 | 4 | 72.5 |
| 119 | 0 | 15 | 6 | 72.5 |
| 120 | 0 | 17 | 6 | 72.5 |
| 121* | 0 | 140 | 58 | 67.2 |

Remarks:
In Experiment Nos. 102* and 103* the results after the first batch are given.

TABLE 3

| Colloid | Diameter of particles (nm) |
|---|---|
| AlF$_3$ colloid | 30–100 |
| Silicate colloid | 10–20 |
| Aluminum hydroxide colloid | 20–50 |
| Iron oxide colloid | 20–50 |
| Gold colloid | 10–20 |
| Silver colloid | 10–20 |
| Sulfur colloid | 20–50 |

Example 2

Experiment Nos. 201 to 211

A stainless-steel polymerization vessel having an internal capacity of 100 liters and equipped with a stirrer was used for polymerization as described below.

In each experiment, the aluminum fluoride, the inorganic colloid, solvent and pH adjuster as set forth in Table 4 were mixed in such amounts as to give the concentration and pH shown in Table 4.

The coating liquid thus prepared was applied to the inner wall of the polymerization vessel and to the stirring shaft, stirring blades and the like areas with which the monomer comes into contact during polymerization to form a coating film, followed by washing with water.

It is noted, however, that Experiment No. 202* is a comparative experiment in which no coating liquid was applied, and Experiment No. 203* is a comparative experiment in which a coating liquid not meeting the requirements of the present invention was applied.

The polymerization vessel having been treated as above was charged with 45 kg of water, 1.1 kg of sodium dodecylbenzenesulfonate, 60 g of t-dodecyl mercaptan and 65 g of potassium peroxodisulfate. After the inside of the polymerization vessel was replaced with nitrogen gas, 6.5 kg of styrene and 19 kg of butadiene were charged into the vessel, and polymerization was carried out at 50° C. for 15 hours. After the polymerization was completed, the polymeric product and unreacted monomers were recovered, followed by washing the inside of the vessel with water to remove residual resin.

Thereafter, the above process from applying a coating liquid through carrying out polymerization to washing with water was repeated batchwise ten times. After the tenth polymerization batch was over, the amount of polymer scale deposited was measured on an area of the inner wall which was in contact with the liquid phase during polymerization and an area which was located around the interface between gas and liquid phases according to the method below. However, in Experiment Nos. 202 and 203, since much polymer scale was deposited after the first polymerization run, the batch was not repeated. The results are given in Table 5.

Measurement of luminosity index (L value)

To 1 kg of the polymer latex obtained was added 1 kg of 2% magnesium sulfate solution to cause aggregation and sedimentation. The sediment was filtered off, washed with a hot water at 80° to 90° C. twice or three times and dried at 40° C. for 25 hours in a vacuum dryer to give a resin. The resin was placed in a molding frame measuring 9×9 cm and having a thickness of 0.1 cm, heated at 195° C. under a pressure of 50 to 60 kgf/cm² for 0.2 hour and press molded under a final pressure of 80 kgf/cm² to prepare a test specimen. This test specimen was measured for luminosity index L in the same manner as in Example 1.

TABLE 4

| Exp. No. | Aluminum fluoride | Inorganic colloid | Total con. (a) + (B) (%) | Wt. ratio (A)/(B) Solvent | Solvent (wt. ratio) | pH adjuster (pH) |
|---|---|---|---|---|---|---|
| 201 | AlF₃ colloid | Silicate colloid | 0.6 | 100/100 | Water/MeOH (50/50) | Phosphoric acid (6.0) |
| 202* | None | None | — | — | — | — |
| 203* | None | Silicate colloid | 0.6 | 0/100 | Water/MeOH (50/50) | Phosphoric acid (6.0) |
| 204 | AlF₃ H₂O | None | 0.6 | 100/0 | Water/MeOH (50/50) | Phosphoric acid (6.0) |
| 205 | AlF₃ colloid | None | 0.6 | 100/0 | Water/MeOH (50/50) | Phosphoric acid (6.0) |
| 206 | AlF₃ colloid | Aluminum hydroxide colloid | 0.6 | 100/100 | Water/MeOH (70/30) | Phosphoric acid (6.0) |
| 207 | AlF₃ colloid | Iron hydroxide colloid | 0.6 | 100/50 | Water/MeOH (70/30) | Tannic acid (6.0) |
| 208 | AlF₃ 9H₂O | Silicate colloid | 0.6 | 100/500 | Water/MeOH (70/30) | Ethylene-diamine (9.5) |
| 209 | AlF₃ H₂O | Silicate colloid | 0.6 | 100/300 | Water/MeOH (90/10) | NaOH (7.0) |
| 210 | AlF₃ H₂O | Iron hydroxide colloid | 0.6 | 100/100 | Water/MeOH (90/10) | Phosphoric acid (6.5) |
| 211 | AlF₃ colloid | Iron hydroxide colloid | 0.6 | 100/60 | Water/MeOH (90/10) | Perchloric acid (3.5) |

TABLE 5

| | Results after 10th batch | | |
|---|---|---|---|
| | Polymer scale amount (g/m²) | | |
| Exp. No. | Liquid phase | Around interface between gas and liquid phases | Luminosity index (L) |
| 201 | 0 | 4 | 85.0 |
| 202* | 300 | 650 | 84.5 |
| 203* | 120 | 230 | 84.6 |
| 204 | 8 | 32 | 84.6 |
| 205 | 1 | 15 | 84.6 |
| 206 | 0 | 5 | 85.0 |
| 207 | 0 | 8 | 85.0 |
| 208 | 0 | 9 | 85.0 |
| 209 | 0 | 6 | 85.0 |
| 210 | 0 | 8 | 85.0 |
| 211 | 0 | 4 | 85.0 |

Remarks:
In Experiment Nos. 202* and 203* the results after the first batch are given.

What is claimed is:

1. A process for producing a polymer comprising polymerizing a monomer having an ethylenically unsaturated double bond in a polymerization vessel having a polymer scale deposition preventive coating film on its inner wall surfaces, wherein said coating film comprises an aluminum fluoride.

2. The process of claim 1, wherein the coating film is further formed on areas with which the monomer comes into contact during polymerization other than the inner wall surfaces in the polymerization vessel.

3. The process of claim 2, wherein the areas include the surfaces of stirring blades, stirring shaft, baffles, condensers, headers, search coil, and bolts.

4. The process of claim 2, wherein the coating film is further formed on areas with which the monomer does not come into contact during polymerization but on which polymer scale may be deposited.

5. The process of claim 4, wherein the areas include the inner surfaces of equipment and pipes of an unreacted monomer recovery system.

6. The process of claim 1, wherein said aluminum fluoride is a colloid of aluminum fluoride.

7. The process of claim 1, wherein the aluminum fluoride is selected from the group consisting of AlF₃, AlF₃9H₂O, AlF₃3.5H₂O, AlF₃3H₂O, AlF₃H₂O, and AlF₃0.5H₂O.

8. The process of claim 6, wherein the colloid of the aluminum fluoride has a particle diameter of 1 to 500 nm.

9. The process of claim 6, wherein said coating film further comprises an inorganic colloid other than said aluminum fluoride colloid.

10. The process of claim 1, wherein said coating is formed on said inner wall surfaces using a coating liquid comprising said aluminum fluoride dissolved or dispersed in a solvent.

11. The process of claim 10, wherein the aluminum fluoride is present in the coating liquid in a concentration in a range of from 0.001 to 15% by weight.

12. The process of claim 9, wherein the inorganic colloid other than the aluminum fluoride colloid is selected from the group consisting of ferric hydroxide colloids, silicate colloids, barium sulfate colloids, gold colloids, silver colloids, aluminum hydroxide colloids, sulfur colloids, titanium oxide colloids, antimony oxide colloids, antimony sulfate colloids, tin oxide colloids, iron ferricyanide colloids, and iron ferrocyanide colloids.

13. The process of claim 12, wherein the inorganic colloid is selected from the group consisting of ferric oxide colloids, silicate colloids, gold colloids, and aluminum hydroxide colloids.

14. The process of claim 9, wherein the inorganic colloid other than the aluminum fluoride colloid has a particle diameter in the range of from 1 to 500 nm.

15. The process of claim 9, wherein the inorganic colloid other than the aluminum fluoride colloid is present in said coating in an amount in the range of from 1 to 2,000 parts by weight per 100 parts by weight of the aluminum fluoride.

16. The process of claim 9, wherein said coating film is formed by coating said inner wall surfaces with a coating liquid comprising said aluminum fluoride and said other inorganic colloid, both of which are dissolved or dispersed in a solvent, at a total concentration in the range of from 0.001 to 15% by weight.

17. The process of claim 9, wherein said coating film further comprises a water-soluble polymeric compound selected from the group consisting of hydroxyl group-containing polymeric compounds, cationic polymeric compounds, anionic polymeric compounds and amphoteric polymeric compounds.

* * * * *